United States Patent [19]

Lynne et al.

[11] Patent Number: 5,448,722
[45] Date of Patent: Sep. 5, 1995

[54] METHOD AND SYSTEM FOR DATA PROCESSING SYSTEM ERROR DIAGNOSIS UTILIZING HIERARCHICAL BLACKBOARD DIAGNOSTIC SESSIONS

[75] Inventors: Kenton J. Lynne, Rochester, Minn.; Nicholas Samra, Austin, Tex.; Thomas M. Walker, Rochester, Minn.

[73] Assignee: International Business Machines Corporation, Armonk, N.Y.

[21] Appl. No.: 29,072

[22] Filed: Mar. 10, 1993

[51] Int. Cl.⁶ .............................................. G06F 11/00
[52] U.S. Cl. ........................ 395/650; 395/183.12; 395/161; 395/185.1; 395/916; 395/183.22; 364/481; 364/580; 324/73.1
[58] Field of Search ................. 395/575, 50, 51, 52, 395/53, 10; 371/15.1, 23, 22.1; 364/513

[56] References Cited

U.S. PATENT DOCUMENTS

| | | | |
|---|---|---|---|
| 4,591,983 | 5/1986 | Bennett et al. | 364/403 |
| 4,912,648 | 3/1990 | Tyler | 364/513 |
| 4,916,633 | 4/1990 | Tychonievich et al. | 364/513 |
| 4,920,499 | 4/1990 | Skeirik | 364/513 |
| 4,964,125 | 10/1990 | Kim | 371/15.1 |
| 4,967,368 | 10/1990 | Bolling et al. | 364/513 |
| 4,970,658 | 11/1990 | Durbin et al. | 364/513 |
| 4,975,840 | 12/1990 | DeTore et al. | 364/401 |
| 5,005,143 | 4/1991 | Altschuler et al. | 364/554 |
| 5,006,992 | 4/1991 | Skeirik | 364/513 |
| 5,016,204 | 5/1991 | Simoudis et al. | 364/578 |
| 5,025,391 | 6/1991 | Filby et al. | 364/513 |
| 5,040,118 | 8/1991 | Diller | 364/424 |
| 5,058,043 | 10/1991 | Skeirik | 364/550 |
| 5,081,598 | 1/1992 | Bellows et al. | 364/550 |
| 5,107,497 | 4/1992 | Lirov et al. | 371/15.1 |
| 5,109,380 | 4/1992 | Ogino | 371/15.1 |
| 5,157,668 | 10/1992 | Buenzil, Jr. et al. | 371/15.1 |
| 5,265,035 | 11/1993 | Reifman et al. | 364/551.01 |
| 5,295,231 | 3/1994 | Ogino | 395/77 |

OTHER PUBLICATIONS

Data Base Doss, Docket No. DA986005, D. U. Shorter "General Architecture For Expert Systems".

Data Base Doss, JP 01-224845, Fukai et al. Sep. 7, 1989 "Expert Systems".

Data Base Doss, JP 02-103602, Nishino et al., Apr. 16, 1990 "Diagnosis Supporting Devices".

Data Base Doss, JP 03-179526, Maeda et al., Aug. 5, 1991 "Table Format Knowledge Base".

*Primary Examiner*—Robert W. Beausoliel, Jr.
*Assistant Examiner*—Norman M. Wright
*Attorney, Agent, or Firm*—J. Michael Anglin; L. Bruce Terry; Andrew J. Dillon

[57] ABSTRACT

A method and system in a data processing system for managing a hierarchical error diagnostic system having a plurality of diagnostic modules for diagnosing a component failure within a target system having a predetermined group of components within each of a plurality of hierarchical levels. After the identification of selected hierarchical levels within the target system, and identification of the components within each hierarchical level, a first blackboard data storage area is initialized for utilization during a diagnostic session. Thereafter, a diagnostic analysis of a first predetermined group of components within a first selected hierarchical level is initiated. The diagnostic analysis utilizes the first blackboard data storage area and multiple diagnostic modules assigned to diagnose the components within the first selected hierarchical level. Upon conclusion of the diagnostic analysis, a diagnostic result is determined from selected information learned during the first diagnostic analysis. In preparation for a second diagnostic analysis of a second group of components in a second hierarchical level, which were selected in response to a result from the initial diagnostic analysis, a second blackboard data storage area is initialized utilizing selected information learned from the initial diagnostic analysis. Thereafter, a second diagnostic analysis of a second predetermined group of components within a second selected hierarchical level is automatically initiated. The second diagnostic analysis utilizes selected information learned during the initial diagnostic session, which is stored within the second blackboard data storage area during initialization, and multiple diagnostic modules within the second selected hierarchical level.

12 Claims, 6 Drawing Sheets

METHOD AND SYSTEM FOR DATA PROCESSING SYSTEM ERROR DIAGNOSIS UTILIZING HIERARCHICAL BLACKBOARD DIAGNOSTIC SESSIONS

BACKGROUND OF THE INVENTION

1. Technical Field:

The present invention relates in general to an improved method and system for diagnosing component failure within a data processing system, and in particular to a method and system for implementing a modular diagnostic system for diagnosing component failure among groups of components within multiple hierarchical levels within a data processing system. Still more particularly, the present invention relates to a method and system for implementing a hierarchical diagnostic system for diagnosing component failure within a data processing system utilizing diagnostic modules which diagnose groups of components in multiple hierarchical levels and share learned information between hierarchical levels.

2. Description of the Related Art:

Data processing systems have become increasingly complex, and as a result, the amount of time required to identify a failed component within a data processing system has also increased. Presently, the complexity of some data processing systems, combined with the need to quickly repair the data processing system, already requires the use of automated diagnostic equipment to locate component failures. Frequently such automated diagnostic equipment utilizes artificial intelligence in the form of neural networks and expert systems.

A data processing system is said to have artificial intelligence if it can perform functions normally associated with human intelligence, such as reasoning, learning, and self-improvement. As mentioned above, an "expert system" is one example of an artificially intelligent system. An expert system may be utilized to solve problems in a particular application area, such as diagnosis of component failure, by drawing inferences from a knowledge base acquired by human expertise.

Generally, when faced with a problem, an expert system cannot access an answer to the problem directly. The expert system may utilize a plausible solution generator that generates all possible solutions to a problem. The plausible solutions must then be searched, utilizing a variety of search techniques, and tested, until a solution is found. The set of possible solutions to a problem is called a knowledge base. Such a knowledge base is a data base that contains rules or information (i.e., facts) about human experience in a particular field of knowledge and data resulting from solution of problems that have been previously encountered. Although there are several known techniques to increase the efficiency of searching the knowledge base, expert systems containing more than a few hundred rules become difficult to maintain, and as more rules and facts are added to the knowledge base, the performance of the expert system deteriorates rapidly.

One method of improving the efficiency of an expert system is to utilize multiple expert systems that work together to analyze a problem. By subdividing the problem, each individual expert system may utilize a separate, private and unique knowledge base, which is smaller than would otherwise be required to analyze an entire problem. In addition to the private knowledge bases, the individual expert systems are permitted to communicate through a central "blackboard" data storage area while diagnosing a problem during a "blackboard session." A blackboard data storage area is a common working data storage area for storing data that is accessible to several expert systems, and is utilized to communicate intermediate diagnostic results, or learned information, from one expert system to other expert systems which may be diagnosing the same problem. Therefore, the blackboard contains information, learned by the expert systems participating in the blackboard session, which is currently known about the problem.

Each expert system is then able to utilize the information stored within the blackboard data storage area to supplement the information contained within each expert system's knowledge base. When one expert system learns new information about the problem which may be utilized by another expert system, the expert system sends the information to the blackboard data storage area, so that other expert systems may utilize that learned information to further explore the problem. Thus, the expert systems in the blackboard session analyze a problem in a manner roughly analogous to a group of people, assembled in a meeting room, discussing and analyzing a problem.

As the complexity of the target system (the system under diagnosis) increases, it may be necessary to limit the number of experts utilized during a blackboard session. In order to limit the number of expert systems utilized during a blackboard session, and to employ different types of expert systems to diagnose different parts of a target system, the target system may be divided into hierarchical levels, each of which contains a selected group of components. Therefore, in order to diagnose a problem within a complex target system, multiple blackboard systems, each within a different hierarchical level may be required.

Therefore, it should be apparent that a need exist for a method and system for managing a hierarchical error diagnostic system which utilizes multiple diagnostic modules in multiple blackboard sessions, and wherein information learned by diagnostic modules in one blackboard session may be utilized by diagnostic modules in another blackboard session to diagnose component failure within a target system having multiple hierarchical levels of components.

SUMMARY OF THE INVENTION

It is therefore one object of the present invention to provide an improved method and system for diagnosing component failure within a data processing system.

It is another object of the present invention to provide a method and system for implementing a modular diagnostic system for diagnosing component failure among groups of components within multiple hierarchical levels within a data processing system.

It is yet another object of the present invention to provide a method and system for implementing a hierarchical diagnostic system for diagnosing component failure within a data processing system utilizing diagnostic modules which diagnose groups of components in multiple hierarchical levels and share learned information between hierarchical levels.

The foregoing objects are achieved as is now described. A method and system are disclosed in a data processing system for managing a hierarchical error diagnostic system having a plurality of diagnostic modules for diagnosing a component failure within a target system having a predetermined group of components within each of a plurality of hierarchical levels. After the identification of selected hierarchical levels within the target system, and identification of the components within each hierarchical level, a first blackboard data storage area is initialized for utilization during a diagnostic session. Thereafter, a diagnostic analysis of a first predetermined group of components within a first selected hierarchical level is initiated. The diagnostic analysis utilizes the first blackboard data storage area and multiple diagnostic modules assigned to diagnose the components within the first selected hierarchical level. Upon conclusion of the diagnostic analysis, a diagnostic result is determined from selected information learned during the first diagnostic analysis. In preparation for a second diagnostic analysis of a second group of components in a second hierarchical level, which were selected in response to a result from the initial diagnostic analysis, a second blackboard data storage area is initialized utilizing selected information learned from the initial diagnostic analysis. Thereafter, a second diagnostic analysis of a second predetermined group of components within a second selected hierarchical level is automatically initiated. The second diagnostic analysis utilizes selected information learned during the initial diagnostic session, which is stored within the second blackboard data storage area during initialization, and multiple diagnostic modules within the second selected hierarchical level.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
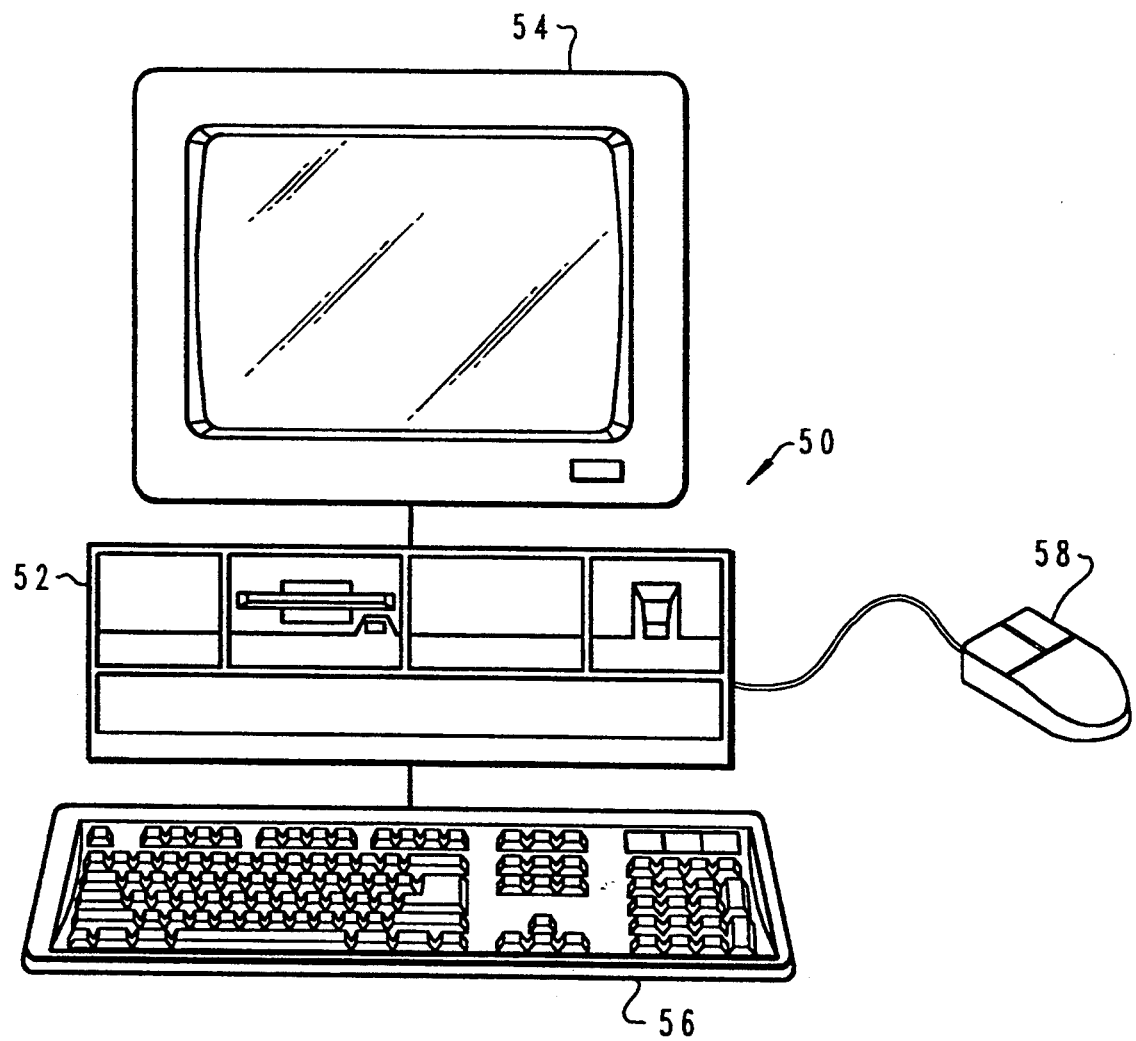
FIG. 1 depicts a pictorial illustration of a data processing system which may be utilized to implement a preferred embodiment of the present invention.

With reference now to the figures and in particular with reference to FIG. 1, there is depicted a pictorial illustration of a data processing system 50 which may be utilized to implement a preferred embodiment of the present invention. Data processing system 50 includes a system unit 52, a video display terminal 54, a keyboard 56, and a mouse 58. Data processing system 50 may be implemented utilizing any suitable computer, such as an IBM RS/6000 workstation, a product of International Business Machines Corporation, located in Armonk, N.Y. "RS/6000" is a registered trademark of International Business Machines Corporation, located in Armonk, N.Y. Although the depicted embodiment utilizes a workstation, a preferred embodiment of the present invention may also be implemented in other types of data processing systems, such as for example, personal computers, intelligent workstations, mid-range computers, or mainframe computers. Those skilled in the art should also appreciate that the hardware depicted in FIG. 1 may vary for specific applications. For example, other peripheral devices, such as optical disk media, audio adapters, and the like, may also be utilized, in addition to the hardware depicted.

Figure 2:
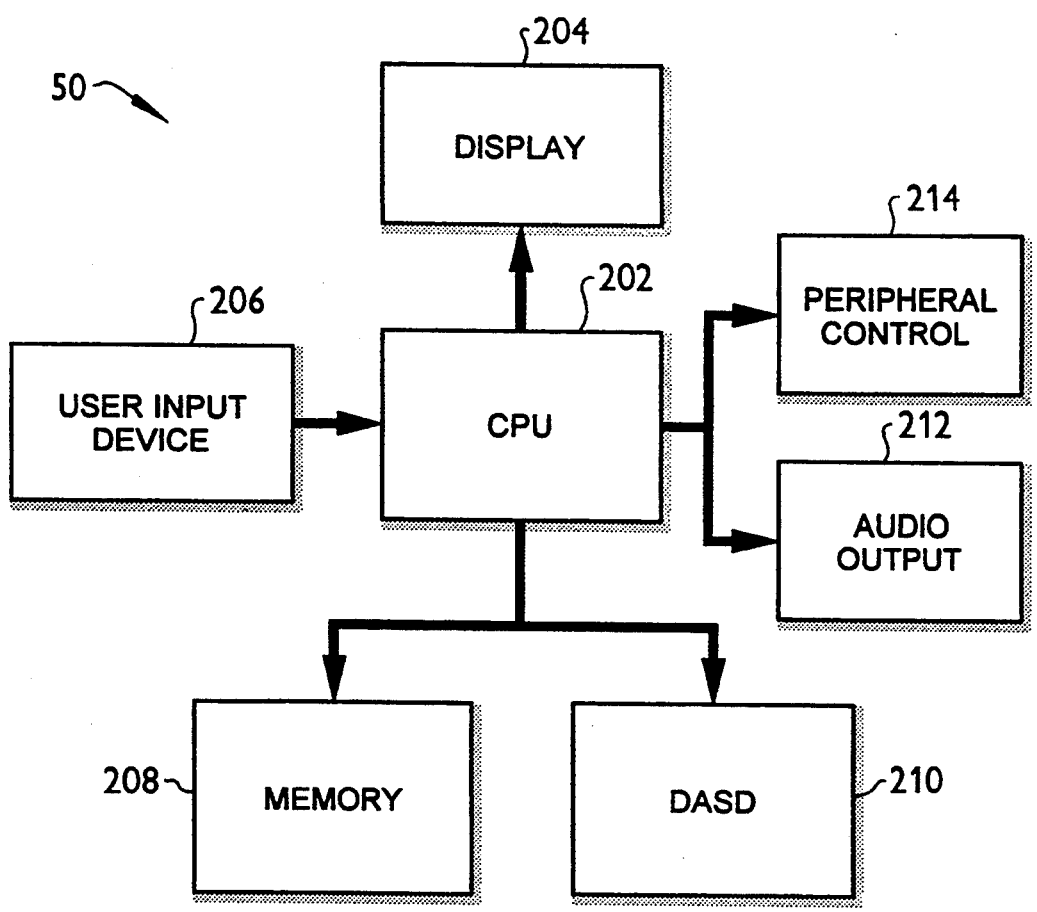
FIG. 2 is a more detailed high level block diagram further illustrating the preferred data processing system of FIG. 1.
Figure 4A:
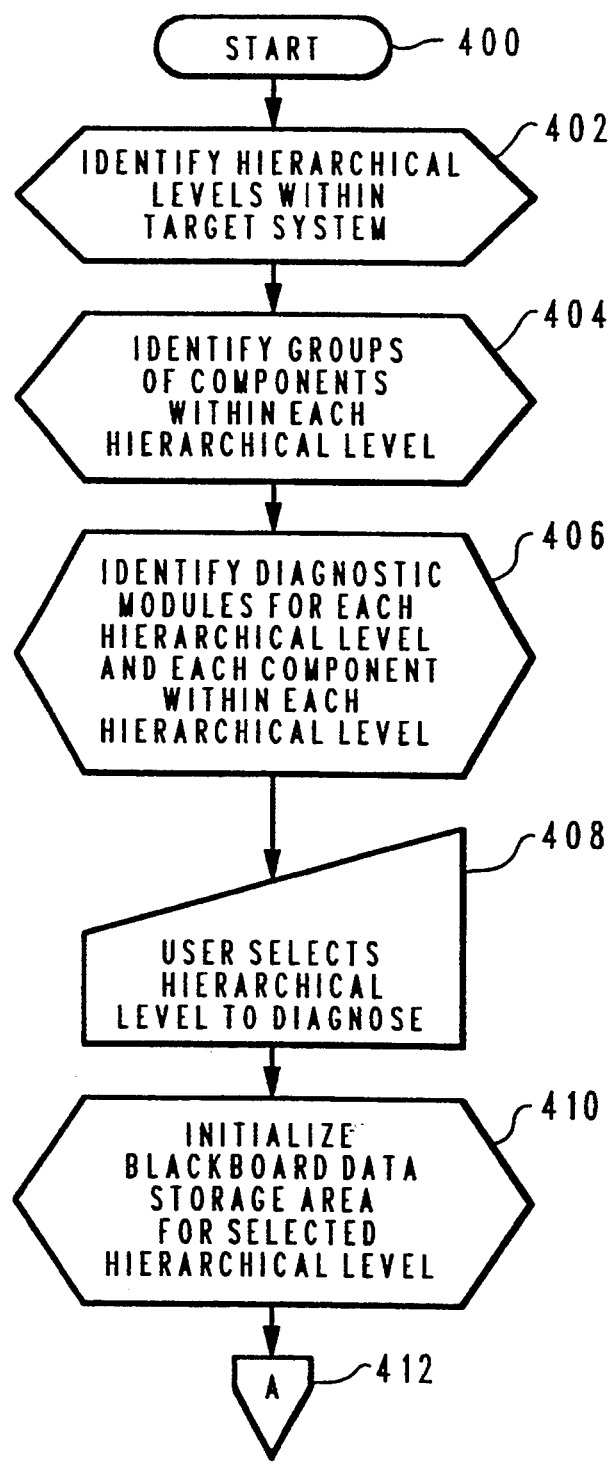
FIGS. 4a-c depicts a logical flowchart which illustrates the process of locating a failed component within a target system having multiple hierarchical levels of components.
Figure 4B:
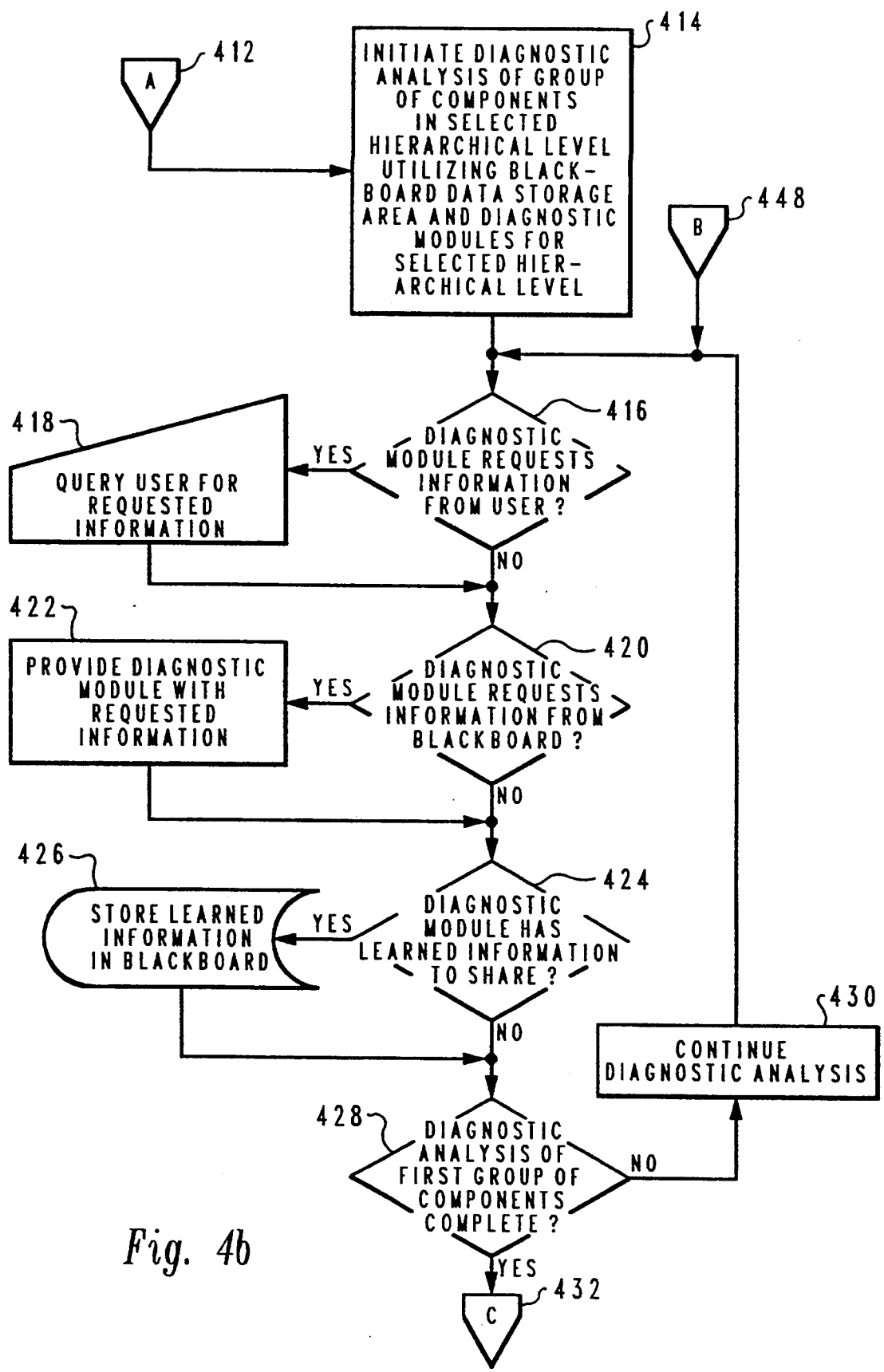
Figure 4C:
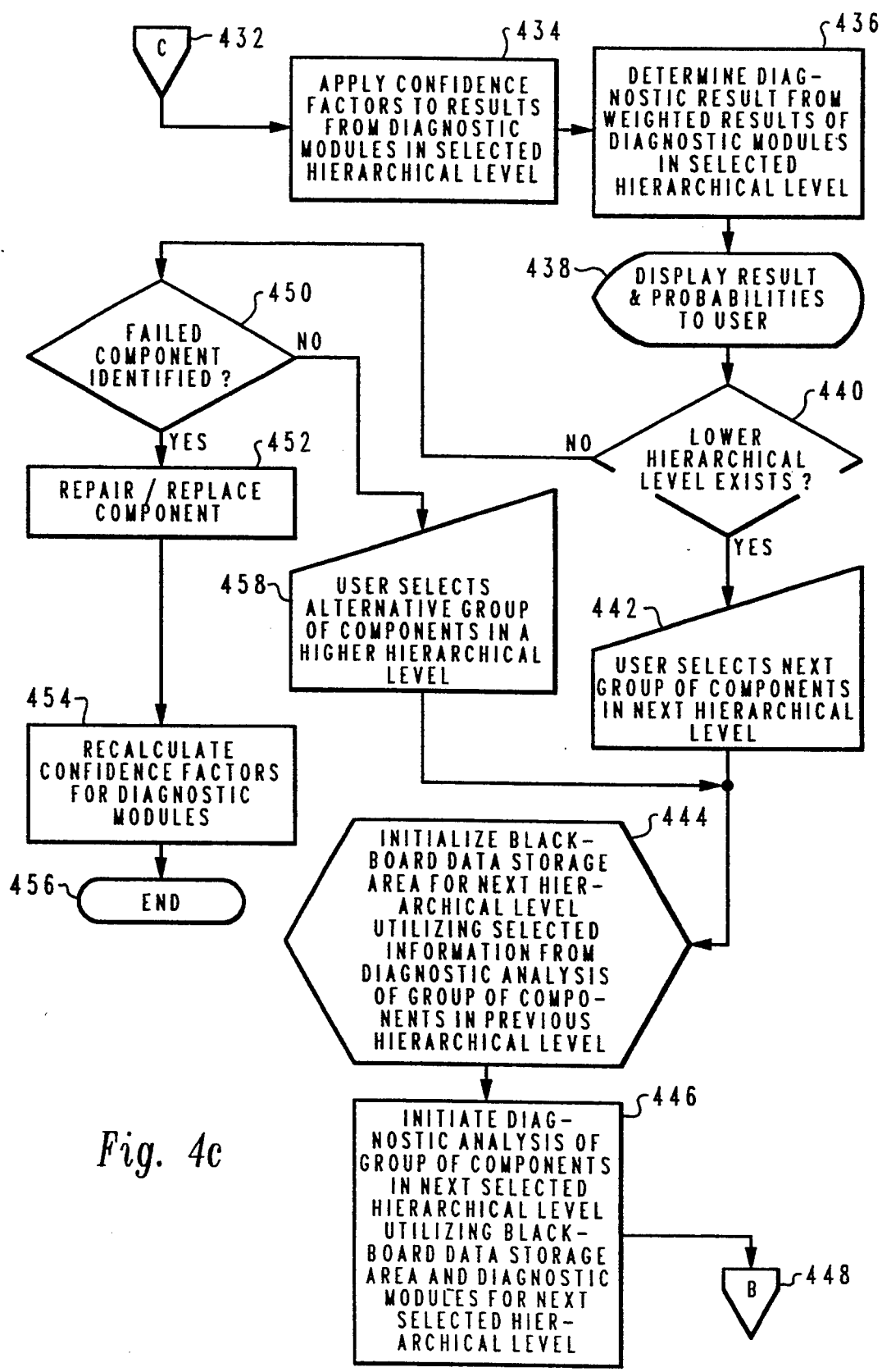

FIG. 2 is a more detailed high level block diagram further illustrating preferred data processing system 50 of FIG. 1. As illustrated, data processing system 50 is controlled primarily by software executed within central processing unit (CPU) 202. CPU 202 is coupled to display 204, and receives user input from user input device 206. CPU 202 is also coupled to memory 208 and one or more direct access storage devices (DASDs) depicted at block 210. Memory 208 and DASD 210 may be utilized for storing data sets and application programs. User input device 206 may be implemented utilizing a mouse, a touch sensitive tablet or screen, a joy stick, a track ball, or a screen activated light pen. CPU 202 may also be coupled to audio output device 212 and peripheral controller 214. Audio output device 212 may include an amplifier and speaker system. Peripheral controller 214 may be utilized to control peripheral devices, such as a logic analyzer (not shown) or other electronic test equipment. In the depicted embodiment of the present invention, CPU 202 is preferably suitably programmed to implement the process depicted in the flowcharts of FIG. 4a, 4b and 4c.

Figure 3:
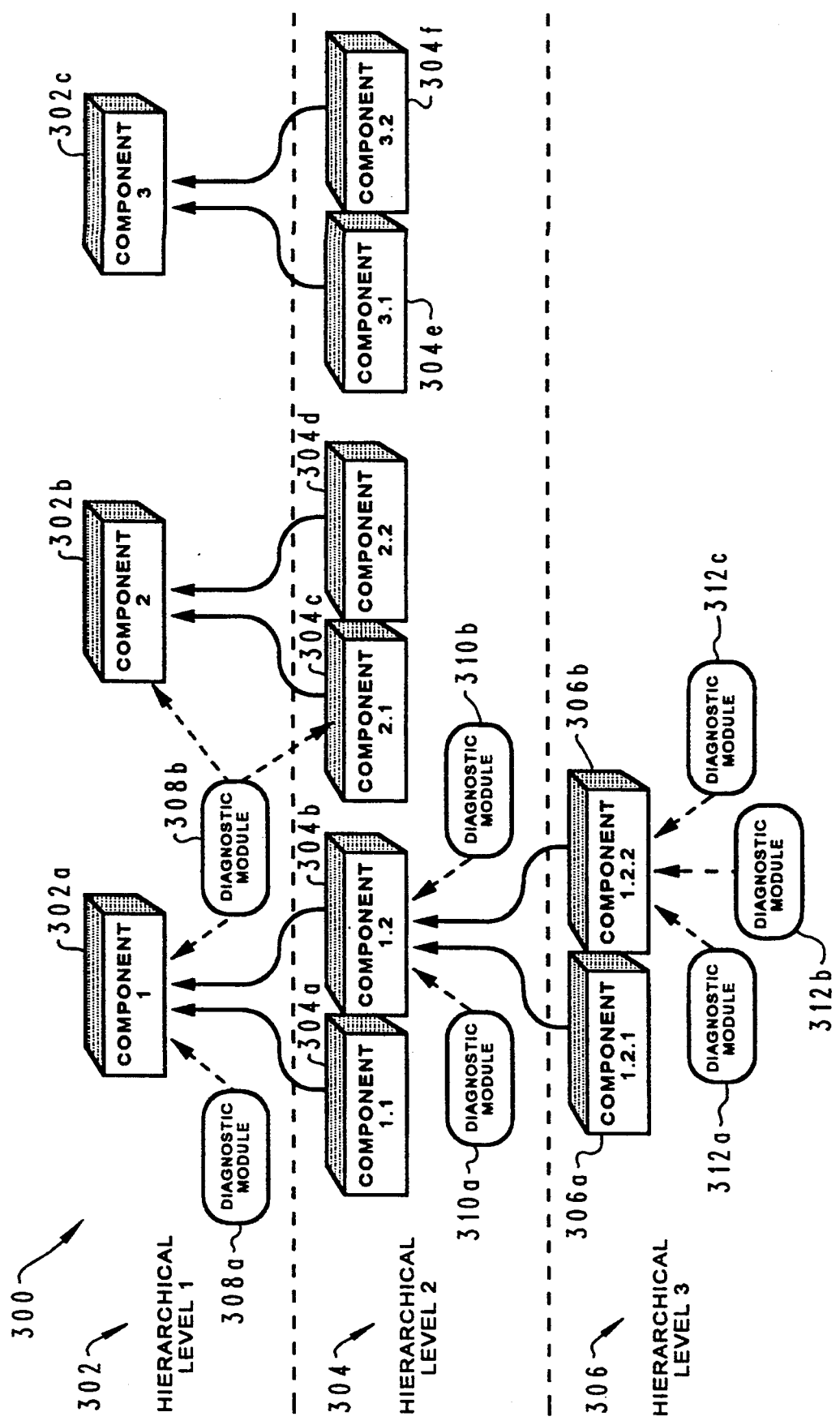
FIG. 3 depicts a pictorial representation of a data processing system having selected components within multiple hierarchical levels.

With reference now to FIG. 3, there is depicted a pictorial representation of a data processing system having selected components within multiple hierarchical levels. In this example, target system 300 (i.e., the system to be diagnosed) is comprised of three hierarchical levels: hierarchical level 1, as indicated at reference numeral 302, hierarchical level 2, as indicated at reference numeral 304, and hierarchical level 3, as indicated at reference numeral 306. Within target system 300, hierarchical levels are determined, generally, by the architecture of target system 300. In the present example, hierarchical level 1, as indicated at reference numeral 302, may be comprised of component 1, as indicated at reference numeral 302a, component 2, as indicated at reference numeral 302b, and component 3, as indicated at reference numeral 302c, wherein component 1 may be a central processing unit, component 2 may be a keyboard, and component 3 may be a display.

The next lower hierarchical level, hierarchical level 2, as indicated at reference numeral 304, is comprised of component 1.1, as indicated at reference numeral 304a, component 1.2, as indicated at reference numeral 304b, component 2.1, as indicated at reference numeral 304c, component 2.2, as indicated at reference numeral 304d, component 3.1, as indicated at reference numeral 304e, and component 3.2, as indicated at reference numeral 304f. Components 304a-304f within hierarchical level 2 are components, such as for example, circuit boards, which comprise components 302a-302c of hierarchical level 1, as indicated at reference numeral 302. That is, component 1, as indicated at reference numeral 302a, which may be a central processing unit, may be comprised of component 1.1, as indicated at reference numeral 304a and component 1.2, as indicated at reference numeral 304b, which may be circuit boards. Similarly, component 2, as indicated at reference numeral 302b may be comprised of component 2.1, as indicated at reference numeral 304c, and component 2.2, as indicated at reference numeral 304d, and component 3, as indicated at reference numeral 302c may be comprised of component 3.1, as indicated at reference numeral 304e, and component 3.2, as indicated at reference numeral 304f. Thus, the hierarchical structure of target system 300 consists of components at each hierarchical level which may include a group of components at the next lower hierarchical level.

Hierarchical level 3, as indicated at reference numeral 306, is the lowest hierarchical level in the present example and is comprised of component 1.2.1, as indicated at reference numeral 306a, and component 1.2.2, as indicated at reference numeral 306b. The components that comprise hierarchical level 3 may include discrete components or modules that comprise the circuit board components within hierarchical level 2, as indicated at reference numeral 304. Although only two components are depicted within hierarchical level 3, as indicated at reference numeral 306, those persons skilled in the art should appreciate that each component within hierarchical level 2, as indicated at reference numeral 304, may be comprised of many components within hierarchical level 3, as indicated at reference numeral 306. For example, if components within hierarchical level 2, as indicated at reference numeral 304, are circuit boards within a data processing system, components 304a–304f may be comprised of hundreds of individual components or numerous modules or groups of components that are included in hierarchical level 3, as indicated at reference numeral 306.

Within each hierarchical level, one or more diagnostic modules is assigned to diagnose a failure of each component within that hierarchical level. For example, within hierarchical level 1, diagnostic module 308a and diagnostic module 308b have been assigned to diagnose failures within component 1, as indicated by the dashed arrow pointing to reference numeral 302a. Similarly, within hierarchical level 2, diagnostic module 310a and 310b have been assigned to diagnose component 1.2, as indicated at reference numeral 304b, and within hierarchical level 3, as indicated at reference numeral 306, diagnostic modules 312a, 312b and 312c have been assigned to diagnose component 1.2.2, as indicated at reference numeral 306b. Diagnostic modules may also be assigned to diagnose more than one component within the same hierarchical level, or to daignose components in different hierarchical levels, as indicated by the dashed arrows pointing from diagnostic module 308b to reference numeral 302b and reference numeral 304c, respectively.

Each diagnostic module is a completely separate program running as an asynchronous process and may conduct one of several different types of diagnostic analyses, such as for example: a data base look-up program for accessing component error codes, a historical data base look-up program for recognizing component failures which have occurred previously, a neural network for matching a current component failure pattern with patterns of failures which have occurred previously, logic simulators for comparing actual component behavior to predicted behavior, and rule based or knowledge based expert systems. Because the components which comprise the various hierarchical levels within target system 300 vary in function and in complexity, diagnostic modules with an appropriate diagnostic strategy should be assigned to the individual components within each hierarchical level.

Those persons skilled in the art should recognize that a particular diagnostic module may be assigned to diagnose several components in a single hierarchical level or multiple components within multiple hierarchical levels. In order to accommodate diagnosis of multiple components, or components within different hierarchical levels, some part of the diagnostic module may require modification, such as for example, a different knowledge base may be necessary. However, a substantial portion of the diagnostic module may be utilized for diagnosing multiple components, or diagnosing components in multiple hierarchical levels.

Turning now to FIG. 4, there is depicted a logical flowchart illustrating the process of locating a failed component within a target system having multiple hierarchical levels of components. The process begins at terminal block 400 and thereafter proceeds to block 402, which depicts the initialization process of identifying hierarchical levels within target system 300 of FIG. 3. Hierarchical levels within a target system may generally be identified by grouping components that have similar characteristics, or levels of complexity. For example, hierarchical level 1 within a data processing system may be comprised of components within the data processing system connected by cables, such as for example, a central processing unit, a keyboard, a modem, and a display. The next lower hierarchical level within the data processing system, hierarchical level 2, may be comprised of components such as circuit boards, which are contained within each of the previously named components in hierarchical level 1. And finally, the lowest hierarchical level within the data processing system, hierarchical level 3, may be comprised of components such as individual electronic parts (e.g., resistors, transistors and integrated circuits), or functional groups of parts (e.g., modules), which are mounted on each circuit board in hierarchical level 2, and which are typically replaced rather than repaired.

After the hierarchical levels within the target system are identified, as illustrated at block 402, the process identifies the groups of components within each hierarchical level, as depicted at block 404. As discussed previously, this step may be as simple as identifying a group of components that are mounted on a particular circuit board, or identifying a group of components, such as keyboards, disk drives, displays, and central processing units, which are connected by cables. Often, the goal at the lowest hierarchical level is to identify the smallest repairable or replaceable group of components, such as a small modular circuit board, an individual integrated circuit, or a discrete component.

Those skilled in the art should recognize that it may be necessary or desirable to have a component, or a group of components, in one hierarchical level shared by more than one component at the next higher hierarchical level. That is, groups of components in the same hierarchical level need not be mutually exclusive. One example of a situation wherein it may be beneficial to include a component within more than one component at the next higher hierarchical level is the situation where a communication chip is mounted on each circuit board in a group of circuit boards which communicate with one another. In order to test the communication chip, it may be desirable for that communication chip to interact with a similar communication chip on another circuit board. Therefore, by performing a diagnostic routine on a group of components in one circuit board, a component in another circuit board may also have been tested.

Next, as depicted at block 406, the process identifies which diagnostic modules will be utilized at each hierarchical level and also which diagnostic modules will be utilized to diagnose each component within each hierarchical level. A particular diagnostic module may be utilized to diagnose one or more components within a particular hierarchical level, and to diagnose components within one or more hierarchical levels. As discussed previously, diagnostic modules may be one of several different types, and therefore an appropriate type of diagnostic module should be chosen to diagnose each particular component. For example, failures within some components may best be diagnosed by a diagnostic module which looks up an error code in a data base, while failure of other components may best be diagnosed by a diagnostic module utilizing an expert system which draws inferences about the component from a knowledge base.

Thereafter, as illustrated at block 408, a user is permitted to interact with the process by selecting the first hierarchical level for diagnosis. Based upon a user's knowledge of the target system and a user's past experience with the target system, a user may specify that the failure diagnosis of a target system begin with a hierarchical level that is below the highest identified hierarchical level.

Next, as illustrated at block 410, the process initializes a blackboard data storage area for the selected hierarchical level. A blackboard data storage area is a common working data storage area which is accessible to several knowledge sources, such as diagnostic modules, and which is utilized to communicate selected information between diagnostic modules. When a diagnostic module, during the course of diagnosing a failure within one or more components within a selected hierarchical level, learns information or facts about such components, the diagnostic module may submit such learned information to be stored in a currently active blackboard data storage area so that the learned information may be utilized to enhance the diagnostic capabilities of other diagnostic modules which are concurrently performing diagnosis of components within the same hierarchical level. Connector block A, as indicated at reference numeral 412, depicts the continuation of the process from FIG. 4a to FIG. 4b.

Next, as depicted at block 414, the process initiates diagnostic analysis of a group of components within a selected hierarchical level utilizing the blackboard data storage area and the diagnostic modules associated with the selected hierarchical level. The diagnostic analysis need not be a real-time diagnostic analysis of the target system during a failure of the target system; the diagnostic analysis may comprise an analysis of log files, condition codes, flashing indicators, trace files, or other recorded data, or symptoms which may be determined by requesting observations from a target system user. A log file or a trace file may contain a list of conditions or status indicators which were recorded and associated with a particular time or machine cycle proximate to the time the target system failed.

As the diagnostic analysis of the group of components proceeds, a diagnostic module may request information from a data processing system user who is conducting the test, as illustrated at decision block 416. Should a diagnostic module require information from a user, the process queries the user for the requested information and the user should respond by entering the requested information, as illustrated at block 418. Similarly, if the diagnostic module requests information from the blackboard, as illustrated at block 420, the process will provide that diagnostic module with the requested information, as depicted at block 422.

Conversely, if a diagnostic module has learned information and is programmed to share such learned information with other diagnostic modules, the process will make such learned information available to other diagnostic modules by storing such learned information in the blackboard data storage area, as illustrated at block 424 and 426. Those persons skilled in the art should recognize that some learned information may be useful to other diagnostic modules currently performing diagnostic analysis in the same hierarchical level, and that some learned information may be useful to other diagnostic modules that may subsequently perform a diagnostic analysis in another hierarchical level. Therefore, it may be useful to store learned information that may be utilized by diagnostic modules which are diagnosing a particular component in the same hierarchical level, or by diagnostic modules which are diagnosing a group of components in a lower hierarchical level that comprise the particular component in the present hierarchical level, in a component information table in the blackboard data storage area. And similarly, it may be useful to store learned information that may be utilized by diagnostic modules in another hierarchical level in a global information table in the blackboard data storage area.

As depicted at block 428, the process determines whether or not the diagnostic analysis of the first group of components is complete. If the diagnostic analysis is not complete, the diagnostic analysis continues, as depicted at block 430, and the process continues to transfer selected information between diagnostic modules and querying the target system user for observations regarding the target system, as illustrated at blocks 416–424 and as discussed above. If the diagnostic analysis of the first group of components is complete, the process continues, via connector C, as indicated at reference numeral 432, from FIG. 4b to FIG. 4c.

Next, as depicted at block 434, the process applies a confidence factor to each result produced by each of the diagnostic modules within the selected hierarchical level. Such confidence factors are mathematical multipliers which are utilized by the process to give more weight to the results produced by diagnostic modules which have historically correctly identified a failed component within a hierarchical level and conversely, to give less weight to the result produced by a diagnostic module which has historically incorrectly identified a failed component within the selected hierarchical level. Typically, a result from a diagnostic module is expressed as a percentage, or probability, that a designated component has failed. For example, diagnostic module 308b of FIG. 3 may produce a result which indicates a 75% chance that component 1, as indicated at reference numeral 302a, has failed.

One method of implementing a confidence factor weighting scheme is to allow the confidence factor to have a value between one (1) and zero (0). As a diagnostic module accumulates a history of properly identifying a failed component, the confidence factor associated with that particular diagnostic module will be adjusted to approach the value of one (1) or will remain at the value of one (1). Conversely, if diagnostic module accumulates a history of improperly identifying a component as failed, the confidence associated with that diagnostic module will be modified to approach the value of zero (0) or remain at the value of zero (0). The confidence factors are then combined with the result of the diagnostic module, which is expressed as a percentage probability that a component has failed, to produce a weighted result. For example, if diagnostic module 308b has historically been correct 50% of the previous diagnostic sessions, and after conducting a present diagnostic section which produces a result that states that component 1, as indicated at reference numeral 302a, has an 80% chance of being the component that failed in hierarchical level 1, as indicated at reference numeral 302, after applying the confidence factor, the weighted result of diagnostic module 308b would be that there is a 40% chance that component 1 is the failed component within hierarchical level 1.

Next, as depicted block 436, the process determines a single diagnostic result from the weighted results of each of the diagnostic modules in the selected hierarchical level. That is, each diagnostic module in the selected hierarchical level is permitted to cast a weighted vote in the form of probabilities that selected components have failed. From such weighted votes, the process determines a single result which may identify, for example, component 1, as indicated at reference numeral 302a, as having a 60% chance of being the failed component and component 2, as indicated at reference numeral 302b, as having a 40% chance of being the failed component. As illustrated at block 438, this result, along with the associated probabilities, are then displayed to the user.

As illustrated at decision block 440, the process then determines whether or not a lower hierarchical level exists within the target system. If a lower hierarchical level does exist, the user is permitted to select the next group of components in the next lower hierarchical level, as depicted at block 442. One skilled in the art should also appreciate that a user, based upon past experience with, or knowledge of target system 300, need not select the component with the highest indicated probability of failure, nor must a user select a component within the next lower hierarchical level; the user may elect to ignore the high probability indication associated with a particular component and select another component, or skip the components in the next lower hierarchical level and select a component in a hierarchical level two or more hierarchical levels lower.

Next, as illustrated at block 444, the process initializes a new blackboard data storage area to be utilized during the diagnostic analysis of the next selected hierarchical level. In the process of initializing the new blackboard data storage area, the process stores selected information in the new blackboard data storage area which was learned by the diagnostic modules during the diagnostic analysis of the group of components in the previous hierarchical level and which was stored in the previously utilized blackboard data storage area. This permits the diagnostic modules in the next selected hierarchical level to benefit from information learned during the blackboard session at the first hierarchical level. The selected information utilized to initialize the new blackboard data storage area may be selected from the global information table and the component information tables discussed above. As a result of a diagnostic module's ability to share and utilize information learned by another diagnostic module, either within the same hierarchical level or between hierarchical levels, the design of diagnostic modules may be simplified because they may not be required to relearn information previously learned by other diagnostic modules.

As depicted at block 446, the process then initiates a diagnostic analysis of the selected group of components in the next selected hierarchical level utilizing the initialized blackboard data storage area and the diagnostic modules within the next selected hierarchical level. Connector B, as indicated at reference numeral 448, indicates the process continues from FIG. 4c to FIG. 4b at block 416, where the process continues to request and share information with other diagnostic modules in the next selected hierarchical level in a manner similar to that discussed previously in relation to the diagnostic analysis conducted at the first selected hierarchical level.

Referring again to block 440, if a lower hierarchical level does not exist, the process then determines whether or not the failed component has been identified, as illustrated at block 450. If the failed component has been identified, the user may then repair or replace the identified failed component, as depicted at block 452. If the failed component has not been identified, the user may backup and select another group of components to diagnose at a higher hierarchical level, as illustrated at block 458.

As illustrated at block 454, after the failed component has been correctly identified, the process then recalculates the confidence factors for each diagnostic module utilized during the entire diagnostic session. To aid the recalculation of confidence factors, each diagnostic session is assigned an identification number and the voting records, or the diagnostic results, of each diagnostic module are recorded. Utilizing such a record of a diagnostic session, the process may then determine which diagnostic modules voted correctly, and which voted incorrectly, during the diagnostic session, and adjust the confidence factor for each diagnostic module accordingly. The process then terminates, as depicted at block 456.

While the invention has been particularly shown and described with reference to a preferred embodiment, it will be understood by those skilled in the art that various changes in form and detail may be made therein without departing from the spirit and scope of the invention.

What is claimed is:

1. A method for managing a hierarchical error diagnostic system having a plurality of diagnostic modules for diagnosing a component failure within a target system having a predetermined group of components within each of a plurality of hierarchical levels, said method comprising the data processing system implemented steps of:

initializing a first blackboard data storage area;
    initiating a first diagnostic analysis of a first predetermined group of components within a first selected hierarchical level utilizing said first blackboard data storage area and a first plurality of diagnostic modules within said first selected hierarchical level;
    determining a diagnostic result and selected information in response to said first diagnostic analysis;
    initializing a second blackboard data storage area utilizing said diagnostic result and selected information determined from said first diagnostic analysis of a first predetermined group of components within said first selected hierarchical level;

automatically initiating a second diagnostic analysis of a second predetermined group of components within a second selected hierarchical level, wherein said second predetermined group of components is identified utilizing said diagnostic result, utilizing said selected information within said second blackboard data storage area and a plurality of diagnostic modules within said second selected hierarchical level, wherein diagnosis may be efficiently managed utilizing a plurality of diagnostic modules which transfer selected information between a plurality of hierarchical levels utilizing a plurality of blackboard data storage areas.

2. The method for managing a hierarchical error diagnostic system according to claim 1, wherein said step of initializing a second blackboard data storage area utilizing said diagnostic result and selected information determined from said first diagnostic analysis of a first predetermined group of components within said first selected hierarchical level further includes the steps of:

storing selected information learned by each of said plurality of diagnostic modules in a global information table; and permitting access, by other diagnostic modules within any of said plurality of hierarchical levels, to said selected information within said global information table.

3. The method for managing a hierarchical error diagnostic system according to claim 1, wherein said step of initializing a second blackboard data storage area utilizing said diagnostic result and selected information determined from said first diagnostic analysis of a first predetermined group of components within said first selected hierarchical level further includes the steps of:

storing selected information learned by each of said plurality of diagnostic modules in a component information table reserved for said selected one of said predetermined group of components; and permitting access, by other diagnostic modules within selected hierarchical levels, to said selected information within said component information table.

4. The method for managing a hierarchical error diagnostic system according to claim 1, wherein said step of determining a diagnostic result in response to said first diagnostic analysis further includes the steps of:

calculating a plurality of confidence factors to be associated with each of said diagnostic modules and based upon a previously demonstrated ability to diagnose a failure of one of said predetermined group of components;

compiling data provided by said diagnostic modules in response to said diagnostic analysis;

processing said compiled data provided by said diagnostic modules utilizing said confidence factors associated with each of said diagnostic modules; and calculating a probability of failure for each of said components within said first predetermined group of components utilizing said processed compiled data.

5. The method for managing a hierarchical error diagnostic system according to claim 4, further including the steps of:

displaying said calculated probability of failure for each of said components within said first predetermined group of components;

permitting a user to select said second predetermined group of components, within said second hierarchical level, in response to said display of said calculated probability of failure for each of said components within said first predetermined group of components; and automatically initiating a second diagnostic analysis of said user selected second predetermined group of components within a second selected hierarchical level utilizing said selected information within said second blackboard data storage area and a plurality of diagnostic modules within said second selected hierarchical level.

6. The method for managing a hierarchical error diagnostic system according to claim 1, wherein said step of initiating a first diagnostic analysis of a first predetermined group of components within a first selected hierarchical level utilizing said first blackboard data storage area and a first plurality of diagnostic modules within said first selected hierarchical level comprises initiating a first diagnostic analysis utilizing artificially intelligent diagnostic modules for performing diagnostic analysis.

7. A system for managing a hierarchical error diagnostic system having a plurality of diagnostic modules for diagnosing a component failure within a target system having a predetermined group of components within each of a plurality of hierarchical levels comprising:

means for initializing a first blackboard data storage area;

means for initiating a first diagnostic analysis of a first predetermined group of components within a first selected hierarchical level utilizing said first blackboard data storage area and a first plurality of diagnostic modules within said first selected hierarchical level;

means for determining a diagnostic result and selected information in response to said first diagnostic analysis;

means for initializing a second blackboard data storage area utilizing said diagnostic result and selected information determined from said first diagnostic analysis of a first predetermined group of components within said first selected hierarchical level;

means for automatically initiating a second diagnostic analysis of a second predetermined group of components within a second selected hierarchical level, wherein said second predetermined group of components is identified utilizing said diagnostic result, utilizing said selected information within said second blackboard data storage area and a plurality of diagnostic modules within said second selected hierarchical level, wherein diagnosis may be efficiently managed utilizing a plurality of diagnostic modules which transfer selected information between a plurality of hierarchical levels utilizing a plurality of blackboard data storage areas.

8. The system for managing a hierarchical error diagnostic system according to claim 7, wherein said means for initializing a second blackboard data storage area utilizing said diagnostic result and selected information determined from said first diagnostic analysis of a first predetermined group of components within said first selected hierarchical level further includes:

means for storing selected information learned by each of said plurality of diagnostic modules in a global information table; and means for permitting access, by other diagnostic modules within any of said plurality of hierarchical levels, to said selected information within said global information table.

9. The system for managing a hierarchical error diagnostic system according to claim 7, wherein said means for initializing a second blackboard data storage area utilizing said diagnostic result and selected information determined from said first diagnostic analysis of a first predetermined group of components within said first selected hierarchical level further includes:

means for storing selected information learned by each of said plurality of diagnostic modules in a component information table reserved for said selected one of said predetermined group of components; and means for permitting access, by other diagnostic modules within selected hierarchical levels, to said selected information within said component information table.

10. The system for managing a hierarchical error diagnostic system according to claim 7, wherein said means for determining a diagnostic result in response to said first diagnostic analysis further includes:

means for calculating a plurality of confidence factors to be associated with each of said diagnostic modules and based upon a previously demonstrated ability to diagnose a failure of one of said predetermined group of components;

means for compiling data provided by said diagnostic modules in response to said diagnostic analysis;

means for processing said compiled data provided by said diagnostic modules utilizing said confidence factors associated with each of said diagnostic modules; and means for calculating a probability of failure for each of said components within said first predetermined group of components utilizing said processed compiled data.

11. The system for managing a hierarchical error diagnostic system according to claim 10, further including:

means for displaying said calculated probability of failure for each of said components within said first predetermined group of components;

means for permitting a user to select said second predetermined group of components, within said second hierarchical level, in response to said display of said calculated probability of failure for each of said components within said first predetermined group of components; and means for automatically initiating a second diagnostic analysis of said user selected second predetermined group of components within a second selected hierarchical level utilizing said selected information within said second blackboard data storage area and a plurality of diagnostic modules within said second selected hierarchical level.

12. The system for managing a hierarchical error diagnostic system according to claim 7, wherein said means for initiating a first diagnostic analysis of a first predetermined group of components within a first selected hierarchical level utilizing said first blackboard data storage area and a first plurality of diagnostic modules within said first selected hierarchical level comprises means for initiating a first diagnostic analysis utilizing artificially intelligent diagnostic modules for performing diagnostic analysis.

* * * * *